United States Patent [19]

Nanos

[11] Patent Number: 5,252,904
[45] Date of Patent: Oct. 12, 1993

[54] AUTO REVERSE CIRCUIT

[75] Inventor: Nicholas M. Nanos, Morton Grove, Ill.

[73] Assignee: General Binding Corporation, Northbrook, Ill.

[21] Appl. No.: 970,070

[22] Filed: Nov. 2, 1992

[51] Int. Cl.$^5$ .............................................. H02P 3/20
[52] U.S. Cl. ................................ 318/739; 318/747; 318/751; 318/782; 318/799; 318/484
[58] Field of Search .............. 318/739, 746, 747, 749, 318/751, 755, 756, 781, 782, 786, 798, 799, 805, 806, 816, 817, 434, 474, 484

[56] References Cited

U.S. PATENT DOCUMENTS

| | | |
|---|---|---|
| 3,593,085 | 7/1971 | Decker, Jr. |
| 3,766,457 | 10/1973 | Fink, Jr. et al. |
| 3,792,324 | 2/1974 | Suarez et al. |
| 3,813,590 | 5/1974 | Ellmore ........................ 318/468 X |
| 4,081,727 | 3/1978 | Green ........................ 363/63 X |
| 4,226,669 | 10/1980 | Vilardi . |
| 4,495,456 | 1/1985 | Vercillo et al. ............... 318/755 |
| 4,820,964 | 4/1989 | Kadah et al. ............... 318/786 |

*Primary Examiner*—Bentsu Ro
*Attorney, Agent, or Firm*—Hill, Steadman & Simpson

[57] ABSTRACT

A control circuit for connection to a split capacitor motor automatically switches to reverse operation when the motor is caused to stop or slow unacceptably by a heavy load. During operation, a voltage is maintained across a relay winding which is sufficient to hold the relay contacts in the normally open position. A slowing or stopping of the motor causes a reduction the voltage across the relay winding, which permits the relay contacts to switch to a configuration that reverses the phase of the current through the main and auxiliary windings of the motor, thereby reversing the motor.

9 Claims, 2 Drawing Sheets

AUTO REVERSE CIRCUIT

BACKGROUND OF THE INVENTION

1. Field of the Invention

The present invention relates generally to a system for automatically reversing a motor and, more particularly, to a control circuit for automatically reversing the motor of a shredder or punch machine which has become jammed.

2. Description of the Related Art

An automatic reversing system is disclosed in U.S. Pat. No. 4,495,456. An AC motor with a start winding that is switched by a centrifugal switch above a predetermined operating speed is connected to a manually operable switch that connects the windings to operating current. The centrifugal switch disconnects the start winding at operating speed, but closes to reconnect the start winding if the motor slows below operating speed. The re-connection of the start winding is with oppositely phased current so that motor operation is reversed.

SUMMARY OF THE INVENTION

An object of the present invention is to provide a reversing circuit that is simple in construction with fewer components and that is inexpensive to make.

Another object of the invention is to provide a highly reliable reversing circuit for a motor.

These and other objects and advantages of the present invention are provided in an auto reversing circuit for a motor having a main winding and an auxiliary winding, the circuit having a relay that is caused to close normally open relay contacts to start the motor in a forward direction. The relay is connected so that a voltage established by the motor operation is maintained across the relay winding to hold the normally open relay contacts closed. Slowing or stopping of the motor results in a drop of the voltage across the relay winding, so that the relay contacts open. Opening of the relay contacts connects the motor in a reverse operation configuration with the phase of the current through the main and auxiliary windings reversed. The phase reversal causes the motor to reverse its rotation, thereby reversing the apparatus being driven by the motor.

The reverse operation of the motor continues only for a limited time. The reverse operation in one embodiment is limited by a timer. In another embodiment, the timing function is incorporated into the auto reverse circuit, including use of a second relay. In a third embodiment, reverse operation is limited by a switch that is triggered by movement of a plunger driven by the motor.

The present invention finds particular utility in paper shredders and paper punches using induction motors for driving the shredder blades or punch, respectively. The circuit reverses the motor that drives the shredder or punch automatically when an unacceptably high load such as a jam is placed on the motor.

DETAILED DESCRIPTION OF THE PREFERRED EMBODIMENTS

Figure 1:
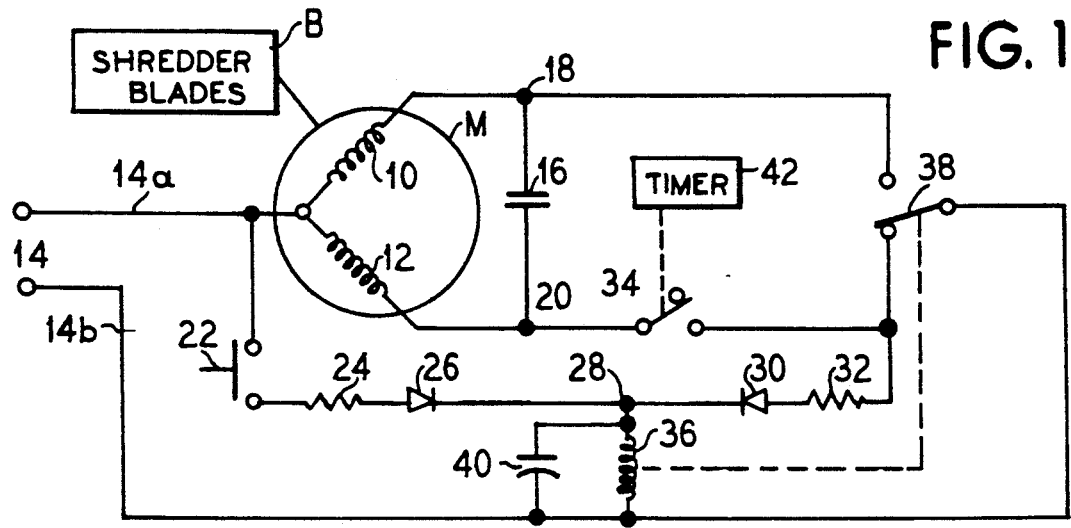
FIG. 1 is a circuit diagram of a first embodiment of a automatic reversing circuit according to the principles of the present invention wherein reverse operation is controlled by an external timer.

FIG. 1 shows a first embodiment of the present invention for controlling a permanent-split capacitor induction motor, also termed a capacitor-start capacitor-run motor. The illustrated circuit is used in a paper shredder having shredder blades B driven by a motor M in the first preferred embodiment, although the auto-reversing function may be used in many applications. Of course, a reduction drive train is provided between the shredder blades B and the motor M but is not shown here for the sake of simplicity. The main field winding 10 and the auxiliary field winding 12 of the motor M are shown connected to power input leads 14 that are connectable to AC power, such as 115 volt, 60 Hz. AC power. A capacitor 16 is connected to the main winding 10 at node 18 and to the auxiliary winding 12 at node 20 so that the phase of the current through the auxiliary winding 12 is shifted by, for example, 90 electrical degrees in the starting configuration to provide the starting torque for the motor M.

The circuit of the first embodiment includes a first switch 22 that is selectively operable from a normally open position to a closed position, a resistor 24 in series with the switch 22, and a diode 26 in series with the resistor 24 to form a first branch connected from the "hot" or supply input lead 14a to a circuit node 28. The switch 22 is a push switch for momentarily closing the switch contacts. Also connected to the circuit node 28 is a second branch including a diode 30 and a resistor 32. The opposite end of the second branch is connected to a second switch 34 that selectively closes a current path between the node 20 and the second branch. Connected between the node 28 and ground 14b of the power supply leads 14 is a winding 36 of a relay. Contacts 38 of the relay selectively connect the ground lead 14b to either the node 18 or to the node 20 through the second switch 34, the relay contacts 38 being shown in this later position. The relay contacts 38 are in the normally closed (NC) position when in the illustrated position. A filter capacitor 40 is connected across the relay winding 36.

In operation, the circuit of the first embodiment in FIG. 1 is shown in the "OFF" state with the motor stationary. The first switch 22 is momentarily operated to close its contacts, which supplies current through the resistor 24 and diode 26 and through the winding 36 of the relay, causing the relay contacts 38 to move to the normally open (NO) position. This connects the motor in the starting configuration which permits current to flow, on one hand, through the main field winding 10 and, on the other hand, through the auxiliary field winding 12 and the capacitor 16 to cause the motor to begin rotating, for example, in a clockwise direction. The rotation of the motor forces the second switch 34 to automatically close, such as under the control of a timer 42 that is triggered by motor rotation.

Due to the inductance of the motor windings 10 and 12 and the capacitance of the capacitor 16, the voltage at the node 20 quickly rises to approximately double the line voltage, which causes enough current to flow through the resistor 32 to the relay winding 36 to maintain the relay contacts 38 in the normally open position. With the relay contacts 38 closed, the rotation of the motor in the forward, or clockwise, position continues.

Any resistance to the rotation of the motor shaft, such as papers being fed through the shredder blades B, changes the back EMF (electro magnetic force) of the motor M which causes the voltage at the node 20 to drop. The holding current through the resistor 32 to the relay winding 36 is, thus, reduced. If enough resistance is applied to the motor shaft, such as due to the slowing down or stopping of the shaft of a paper shredder motor when the shredder blades B jam or are under a heavy load, then the voltage at the node 20 drops to a level at which the relay no longer holds the contacts 38 in the normally open position. In other words, if the shredder blades stop or slow unacceptably, the relay contacts 38 open.

The switching of the relay contacts 38 to the normally closed position results in a change in the current flow path through the capacitor 16 so that the capacitor 16 is effectively connected in series with the main field winding 10 instead of the auxiliary winding 12. This causes the motor M to reverse direction and to run, for example, in the counter clockwise direction. The reversal of the motor M reverses the shredder blades B which frees any material which may have jammed in the shredding blades.

Figure 2:
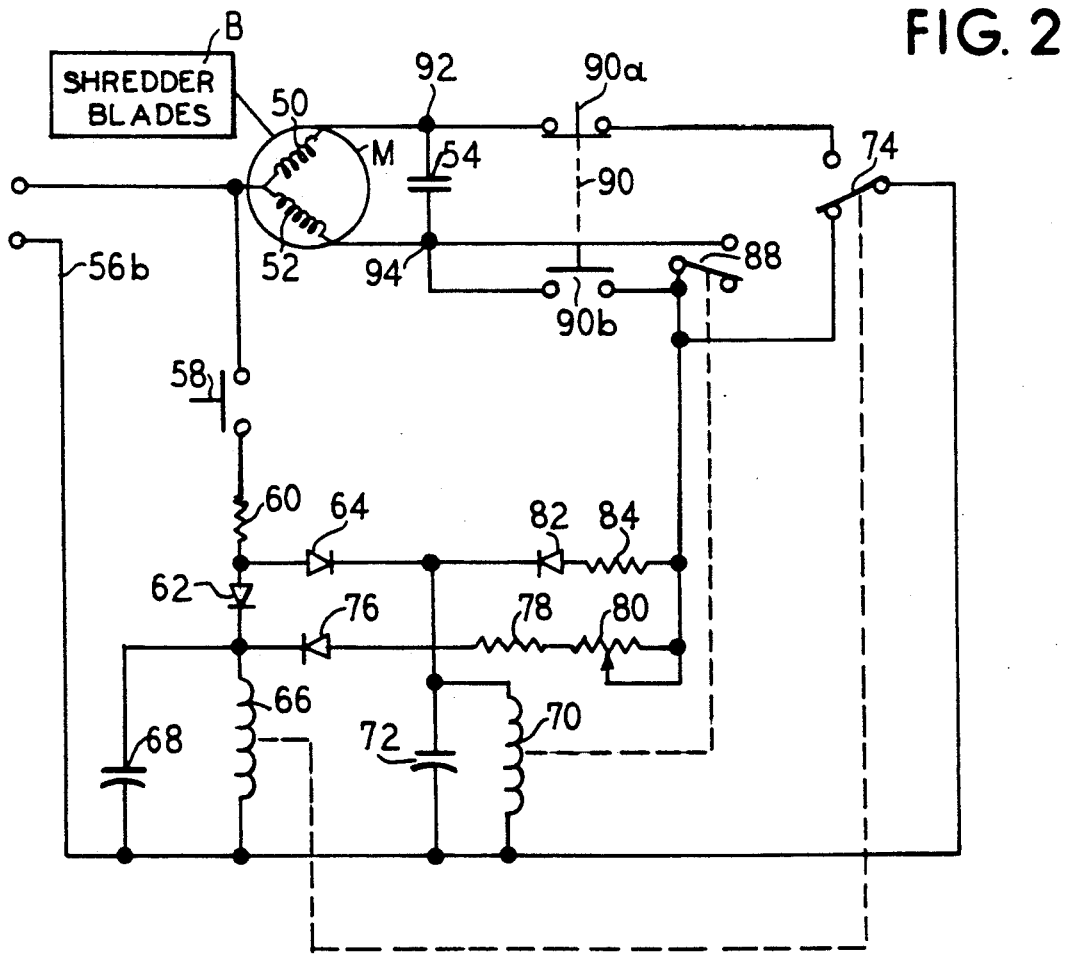
FIG. 2 is a circuit diagram of a second embodiment of the present automatic reversing circuit wherein reverse operation is controlled by an internal timing means.

Reverse rotation of the motor triggers the timer 42 to initiate a timing state which times the period for reverse operation. At the end of the predetermined time, the timer 42 opens the switch 34 which stops the motor M. To turn the motor off manually, the second switch 34 is manually moved to the disconnect position, such as by a push button In FIG. 2 is shown a circuit for operation of a shredder motor M in three modes, namely ON, AUTO-REVERSE, and OFF/REVERSE. Like the embodiment of FIG. 1, the second embodiment includes main field and auxiliary field windings 50 and 52 and a capacitor 54 of a permanent split capacitor motor M. The windings 50 and 52 are connected to AC power leads 56, the source lead 56a also having a momentary contact switch 58 connected thereto. A resistor 60 carries current transmitted through the switch 58 to diodes 62 and 64, the diode 62 being connected to a winding 66 and filter capacitor 68 of a first relay and the diode 64 being connected to carry current to a winding 70 and a filter capacitor 72 of a second relay.

The first relay has a contact arrangement 74 which selectively connects the main winding 50 of the motor M to ground 56b when in the normally open contact position, or to a pair of circuit branches leading to the relay windings 66 and 70 when in the normally closed position. The first branch of the pair of branches includes a diode 76 biased to carry current to the winding 66 of the first relay through a fixed resistor 78 and an adjustable resistor 80. The second branch includes a diode 82 biased to carry current to the winding 70 of the second relay and a resistor 84.

The second relay has a contact arrangement 88 that selectively connects the first and second branches to the auxiliary winding 52 when switched to the normally open position. A dual action switch 90 having a first contact 90a normally closing the current path between the main field winding 50 and the relay contact 74 and a second normally open contact 90b between the auxiliary field winding 52 and the second relay contact 88, the two contact 90a and 90b operating substantially simultaneously.

In operation, the motor is turned on by momentary closing of the switch 58. This supplies current to the windings 66 and 70 of the first and second relays. The first relay contacts 74 move to the normally open position, which drops the voltage at a circuit node 92 to ground and starts the motor M rotating in the forward direction. The motor inductance and motor capacitance causes the circuit node 94 to be raised to a value near double that of the line voltage. The second relay contacts 88 switch to connect the voltage at the node 94 to the windings 66 and 70 of the relays through the two branches. Just enough current is transmitted through the two branches to keep the relays energized. The adjustable resistor 80 sets the load threshold on the shredder motor M at which the reversing operation is triggered.

When the load level or threshold set by the adjustable resistor 80 is exceeded, the present circuit senses the excessive load and automatically reverses the motor to remove the load. In particular, any load on the motor causes a reduction in the voltage at the circuit node 94. The voltage drop causes a corresponding drop in the current through the relay winding 66 which holds the contacts 74 closed. A heavy load or a stalling of the motor M drops the voltage enough to release the relay contact 74 so that it returns to the normally connected position, as shown in FIG. 2. Switching of the contacts 74 to the normally connected position connects the circuit node 94 to ground 56b through the contacts 88. When the circuit node 94 is at ground, the main winding 50 is effectively phase shifted relative to the auxiliary winding and the motor is, thus, caused to run in the reverse direction.

Reverse operation of the motor continues so long as the capacitor 72 remains charged at a voltage sufficient to supply holding current to the second relay winding 70. The capacitor 72 discharges sufficiently in, preferably, one to two seconds to permit the relay contacts 88 to open. Opening of the contacts 88 turns the motor off.

The motor may be turned off during normal, or forward, operation when desired by manual operation of the switch 90 momentarily. By depressing the switch 90 only temporarily, the contacts 90a open the current path between the node 92 and ground 56b. The relay contacts 74 and 88 open and the motor stops. If the switch 90 is held in the operated position, the contacts 90b provide a current path to pull the voltage at the circuit node 94 to ground 56b through the normally closed contacts 74, which causes the motor to operate in the reverse direction for so long as the switch 90 is held in the operated position. Releasing the switch 90 then stops the motor. It is thus possible to manually clear a jam by holding the switch 90 in the operated position until the jam is clear.

Figure 3:
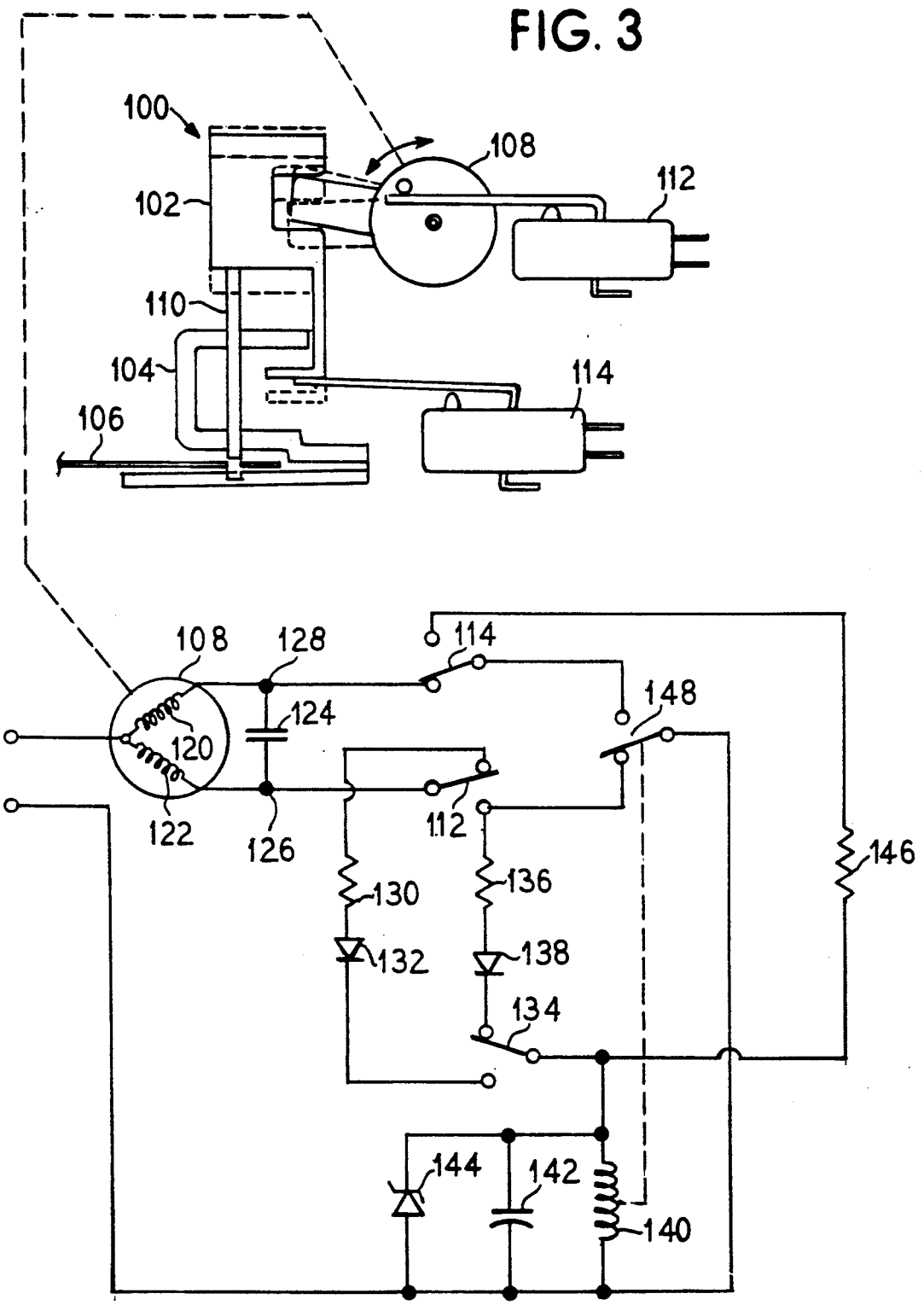
FIG. 3 is a circuit diagram and schematic illustration of components of a third embodiment of the present invention wherein reverse operation is controlled by a switch.

Not only can the present auto reversing circuit be used in a shredder, but it is also applicable in a punch machine as well. An embodiment of the circuit for use in a punch is shown in FIG. 3. A punch mechanism 100 for power paper punches, binding punches, and the like is shown. The punch mechanism 100 includes a punch 102, a paper guide 104 for receiving paper or the like 106, and a punch motor 108. The motor 108 is operated to move the punch 102 between a home position, as shown in solid outline, and a punch position, as shown in dotted outline. In the punch position, a punch blade 110 of the punch 102 passes through the paper 106 to form an opening therein. The positions of the punch 102 are sensed by a home position limit switch 112 and a punch position limit switch 114.

The circuit for operation of the motor 108 is shown in FIG. 3, as well. The motor 108 includes a main field winding 120, an auxiliary field winding 122, and a capacitor 124. The home position limit switch 112 is connected to a circuit node 126 at the auxiliary winding 122, and the punch position limit switch 114 is connected to a circuit node 128 at the main field winding 120.

The home position limit switch 112 is shown in the home position, with the contact switched to a first branch having a resistor 130 and a diode 132 which leads to a switch 134. When the punch 102 is moved out of the home position, the home limit switch 112 is switched to a position in connection to a second branch having a resistor 136 and a diode 138 that leads to another contact position of the switch 134. The switch 134 selectively connects either the first or second branches to a winding 140 of a relay. Connected in parallel with the relay winding 140 is a capacitor 142 and a zener diode 144.

The relay winding 140 is also connected to a resistor 146 that leads to a contact position of the punch limit switch 114. The relay has relay contacts 148 which selectively connect the second branch or the punch limit switch 114 to ground. The position of the relay contacts 148 connected to the second branch is the normally connected position.

In operation, the embodiment of FIG. 3 may operate in three modes, namely POWER ON, PUNCH CYCLE, and AUTO REVERSE.

In the power on mode, the power is first applied to the circuit and the condition of the home limit switch 112 is determinative of the next step. If the limit switch 112 is closed, i.e. in contact with the second branch, the punch is not at the home position and may be between the home and the punch position. The motor 108 is automatically energized through the normally connected relay contacts 148 which connects the auxiliary field winding 122 to ground. This moves the punch up to the home position. When the home limit switch opens, i.e. is connected to the first branch, the motor 108 shuts off and the punch 102 is parked in the home position.

If the limit switch 112 is found to be connected to the first branch when power if first applied, then the punch 102 is already parked in the home position, and no further action is taken.

The punch cycle involves moving the punch 102 from the home position to the punch position and then back to the home position. To initiate the punch cycle, the switch 134 is momentarily closed to a position in contact with the first branch, which supplies activation current through the motor windings 120 and 122, the limit switch 112, the resistor 130 and the diode 132 of the first branch to the relay winding 140. Activation of the relay moves the relay contacts 148 into the normally open position to connect the main field winding 120 to ground, which turns on the motor 108 in the forward direction, thereby moving the punch downward into the punch position. During this time, the capacitor 142 and the zener diode 144 across the relay winding 140 filter the voltage across the winding 140 and clamp the voltage to a predetermined value, such as 24 volts, to keep the relay energized.

Upon activation of the motor 108 in the forward direction, a voltage approximately twice the line voltage appears at the circuit node 126 due to the motor inductance and capacitance. The downward movement of the punch 102 closes the limit switch 112, which applies just enough current through the resistor 136 to keep the relay 140 energized. When the punch 102 reaches the punch position, the limit switch 114 opens the connection to node 128 at the main motor winding 120 and also discharges the relay holding capacitor 142 through the resistor 146 to quickly de-energize the relay. The relay contacts move back to the normally closed position which instantly shifts the phase of the current through the motor windings 120 and 122 by pulling the voltage at node 126 to ground through the relay contacts 148 and the switch 112 to cause the motor 108 to operated in the reverse direction. This causes the punch 102 to move upward toward its home position. When the home position is reached, as indicated by the switching of the switch 112, the circuit is opened at node 126 and the motor 108 is turned off with the punch 102 in the home position.

The auto reverse operation occurs if the punch 102 stalls between the home position and the punch position. This may occur if an excessive load is placed on the punch, such as too great a thickness of papers or the like to be punched. The auto reverse senses the excess load and returns the punch to the home position.

As in the previous embodiments, any resistance to the motor movement causes a drop in the voltage at a circuit node, here this node is node 126. An excess load leads to a voltage drop sufficient to lower the relay holding current that flows through the resistor 136 to the relay winding 140 to a point where the relay now longer maintains the contacts 148 in the normally open position. If the punch stalls, the relay winding 140 is de-energized and the contacts 148 return to the normally closed position. This causes operation of the motor in the reverse direction until the punch 102 is returned to the home position, as explained above.

Although other modifications and changes may be suggested by those skilled in the art, it is the intention of the inventor to embody within the patent warranted hereon all changes and modifications as reasonably and properly come within the scope of his contribution to the art.

I claim:

1. An automatic reverse system for connection to an AC power source, comprising:
    a motor having a main winding and an auxiliary winding and a capacitor connected between said main winding and said auxiliary winding;
    a circuit node at a connection between said auxiliary winding and said capacitor, said circuit node being at a voltage indicative of load on said motor when said motor is operating in a forward direction;
    a relay having a winding and a contact arrangement, said winding being connected to receive a voltage from said circuit node when said motor is operating in a forward direction, said contact arrangement being connected to permit current flow through said capacitor in a forward direction in a first contact position and to reverse current flow through said capacitor when in a second contact position so that said motor is reversed when said contact arrangement is switched from said first contact position to said second contact position;

a selectively operable start switch connected to supply AC power to said winding of said relay and thereby cause switching of said contact arrangement of said relay to said first position to start said motor operating in said forward direction; and means for limiting reverse operation of said motor.

2. An automatic reverse system as claimed in claim 1 wherein said means for limiting comprises an timer for timing a predetermined time and a timer switch controlled by said timer, said timer switch being connected to interrupt operation of said motor.

3. An automatic reverse system as claimed in claim 1 wherein said means for limiting comprises a second relay and a capacitor connected across said second relay, said capacitor maintaining an energizing voltage across said second relay for a predetermined time, said second relay having relay contacts connected to interrupt operation of said motor.

4. An automatic reverse system as claimed in claim 1 wherein said means for limiting comprises a member connected for movement by said motor and a switch operable by contact with said member, said switch being connected to interrupt operation of said motor.

5. An automatic reversing control for a split capacitor motor having a main winding and an auxiliary winding and a phase shifting capacitor, the motor being connectable to a supply and ground of AC power, comprising:

a first circuit branch connected from the supply to a first node and including:

a first switch in said first circuit branch, a first diode connected in series with said first switch, said first diode being biased in a first direction, a second circuit branch connected between said first circuit branch at said node and the auxiliary winding of the motor and including:

a second diode biased in a direction opposite said first direction of said first diode, and a third circuit branch connected between said node and ground and including:

a winding of a relay, said relay having contacts alternately connecting ground to the main winding and the auxiliary winding.

6. An automatic reversing control as claimed in claim 5, further comprising:

a switch connected between the auxiliary winding and the second circuit branch.

7. An automatic reversing control as claimed in claim 5, further comprising:

a filter capacitor connected across said winding of said relay in said third circuit branch.

8. An automatic reversing control for a split capacitor motor having a main winding and an auxiliary winding and a phase shifting capacitor, the motor being connectable to a supply and ground of AC power, comprising:

a first circuit branch connected from the supply to a first circuit node and including:

a switch, and a resistor connected in series with said switch;

a second circuit branch connected from said first circuit node to ground and including:

a winding of a first relay, and a first capacitor across said winding;

a third circuit branch connected from said first circuit node to ground and including:

a winding of a second relay, and a second capacitor across said winding;

a contact arrangement of said first relay connected to connect the motor for forward operation when in held an energized position;

a contact arrangement of said second relay connected to interrupt operating current to the motor when in a de-energized position; and means for delaying de-energization of said second relay after de-energization of said first relay.

9. An automatic reverse circuit for a split capacitor motor having a main winding and an auxiliary winding and a phase shifting capacitor, the motor being connectable to a supply and ground of AC power, comprising:

a first circuit branch connected from the auxiliary winding of the motor to a first circuit node and including:

a first limit switch in a first position, a first resistor in series with said first limit switch, a selectively operable switch in series with said first resistor in a first position;

a second circuit branch connected between said first circuit node and ground and including:

a winding of a relay, a capacitor connected across said winding;

a third circuit branch connected between the auxiliary winding and said first circuit node and including:

said first limit switch in a second position, a second resistor in series with said first limit switch in said second position, said selectively operable switch in a second position in series with said second resistor;

relay contacts of said relay connected to connect the main winding of the motor to ground when in an energized position; and a second limit switch connected to conduct current from the main winding of the motor to said relay contacts when in a closed position.

* * * * *